United States Patent [19]

Olson

[11] 3,868,080

[45] Feb. 25, 1975

[54] PROTECTED TELEPHONE SERVICE INSTALLATION

[75] Inventor: John B. Olson, Milwaukee, Wis.

[73] Assignee: Utility Products Co., Milwaukee, Wis.

[22] Filed: Nov. 2, 1973

[21] Appl. No.: 412,197

[52] U.S. Cl. .......... 248/205 R, 174/38, 174/45 R, 174/58, 248/156, 248/221, 248/231, 248/300

[51] Int. Cl. .......... H02g 3/02

[58] Field of Search .......... 174/38, 44, 45 R, 48, 58, 174/60, 81, 82; 220/3.3, 3.9, 3.92; 248/156, 205 R, 221, 231, 300; 317/9 R, 114, 116, 118, 120; 337/186, 188, 187, 191, 198, 207; 52/27, 28, 38, 40, 721

[56] References Cited

UNITED STATES PATENTS

| | | | |
|---|---|---|---|
| 1,462,026 | 7/1923 | Booth | 174/60 |
| 2,230,734 | 2/1941 | Van Antwerp | 174/45 R |
| 2,436,431 | 2/1948 | Hasselhorn | 174/58 X |
| 3,310,712 | 3/1967 | Paddock | 317/120 |
| 3,539,138 | 11/1970 | Desroches | 248/231 X |

FOREIGN PATENTS OR APPLICATIONS

| | | | |
|---|---|---|---|
| 450,520 | 4/1968 | Switzerland | 174/58 |

OTHER PUBLICATIONS

Utility Products Co. Advertisement, Utility Products Co., 3111 W. Mill Road, Milwaukee Wisconsin, received in Patent Office Apr. 22, 1959, 4 pages total.

*Primary Examiner*—Laramie E. Askin

[57] ABSTRACT

A stake of channel shaped cross section adapted to be driven into the ground directly adjacent to the exterior of a building to which telephone service is to be supplied, with the open side of the channel facing and covered by the building. A plate secured to the upper end of the stake has a telephone circuit protector secured to its front. The end portion of a buried service cable adjacent to the building is led up through the enclosure provided by the stake in cooperation with the exterior of the building, and has its conductors secured to terminals in the protector.

2 Claims, 6 Drawing Figures

PROTECTED TELEPHONE SERVICE INSTALLATION

This invention relates to telephone installations, and has more particular reference to installations of the type wherein telephone service is supplied to a building via a buried service cable.

In most installations, the end portion of the service cable which is adjacent to exterior wall of the building is brought up out of the ground to have its conductors connected to a circuit protector located from 2 to about 4 feet above ground level. The circuit protector is for protection against overvoltages, and both it and the adjacent above ground end of the service cable are secured directly to the exterior of the building.

The circuit protector is enclosed within a housing comprising a cover which serves to prevent tampering with the protector and the electrical connections made thereto. That portion of the service cable extending between the protector and ground level, however, has heretofore remained entirely exposed. As a result, it was subject to damage either by intentional acts of vandalism or through accidentally inflicted injury.

It is an object of the invention to provide a protected telephone service installation of the type mentioned in the preceding paragraph, featuring a more or less universal mounting plate adapted to readily permit securement thereto of overvoltage protectors of different makes and styles.

More specifically, it is a purpose of the invention to provide a telephone service installation featuring an elongated stake of channel shaped cross section having the mounting plate secured to its top, and which can have its lower portion driven into the ground adjacent to the exterior of the building to which telephone service is to be supplied, to cooperate therewith in enclosing the above ground length of service cable in the space between its flanges and web.

With these observations and objectives in mind, the manner in which the invention achieves its purpose will be appreciated from the following description and the accompanying drawings which exemplify the invention, it being understood that changes may be made in the specific apparatus disclosed herein without departing from the essentials of the invention set forth in the appended claims.

The accompanying drawings illustrate two complete examples of the invention constructed according to the best modes so far devised for the practical application of the principles thereof, and in which.

Figure 1:
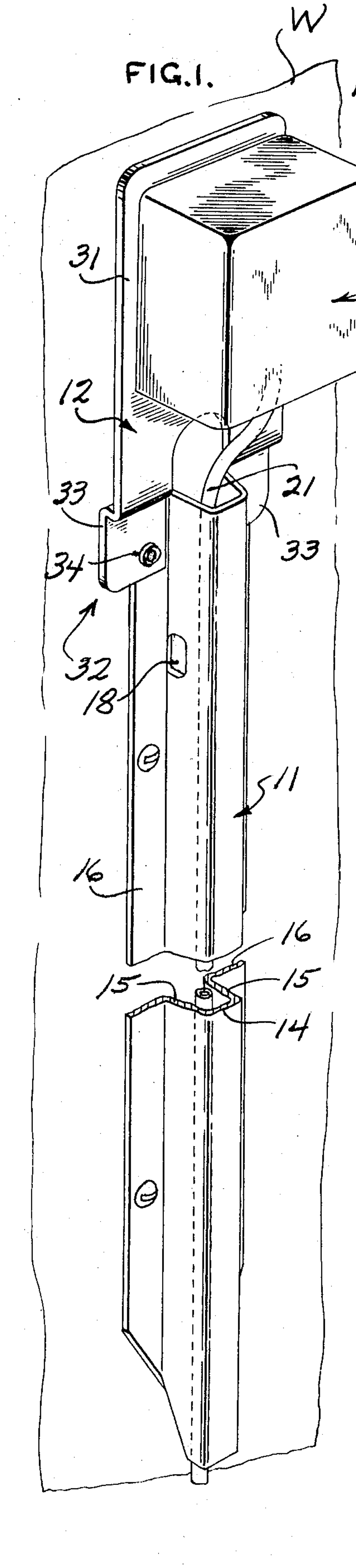
FIG. 1 is a perspective of a mounting device for telephone circuit protectors, illustrating one embodiment of the invention.

Referring now to the accompanying drawings, the numeral 10 generally designates a circuit protector mounting device of this invention. It is comprised of an elongated upright stake 11, and a mounting plate 12 which is secured to the top of the stake. A conventional circuit protector 13 is secured to the mounting plate at its front.

The stake 11 is fabricated from sheet steel, and has a substantially channel shaped cross section. Hence, it can be said to have a web 14 at its front, and opposite flanges 15 which extend rearwardly from the web. However, the flanges diverge toward their ends remote from the web. Coplanar wings 16 that are integral extensions of the flanges extend outwardly in opposite directions therefrom, in parallel relation to the web 14 to form the rearmost part of the stake.

The stake can be driven a short way into the ground directly adjacent to an exterior wall W of a building which is to be supplied with telephone service. Opposite holes 17 in upper portions of the wings 16 provide for securement of the stake to said wall W of the building with its wings 16 in flatwise engagement therewith and its web 14 spaced from the wall by the channel flanges 15.

The flanges 15 are also preferably provided with two pairs of holes 18, located in portions of the flanges which are adjacent to the wings 16. The holes of each pair are located opposite one another and are elongated in the direction of the length of the stake, to receive the metal straps 19 of clamps such as can be used to securely fasten the stake to the riser pipe 20 of an externally mounted electric service meter in the manner seen in FIG. 6.

In either type of mounting, however, the open rear side of the channel is closed by a surface of the structure to which the stake is secured, so that the stake cooperates with that structure in the provision of an elongated enclosure. The above ground end portion of the service cable 21 which is to be connected to the circuit protector 13 is housed in this enclosure to be fully protected thereby.

The free end of the cable 21 extends upwardly out of the top of the channel shaped stake and into an opening 22 in the underside of the circuit protector 13 on the mounting plate 12. The conductors 24 and 25 in the cable are respectively connected to the service terminals 26 and 27 of the circuit protector; and a third terminal 28 on the protector has a ground conductor 29 of the cable secured to it.

Figure 2:
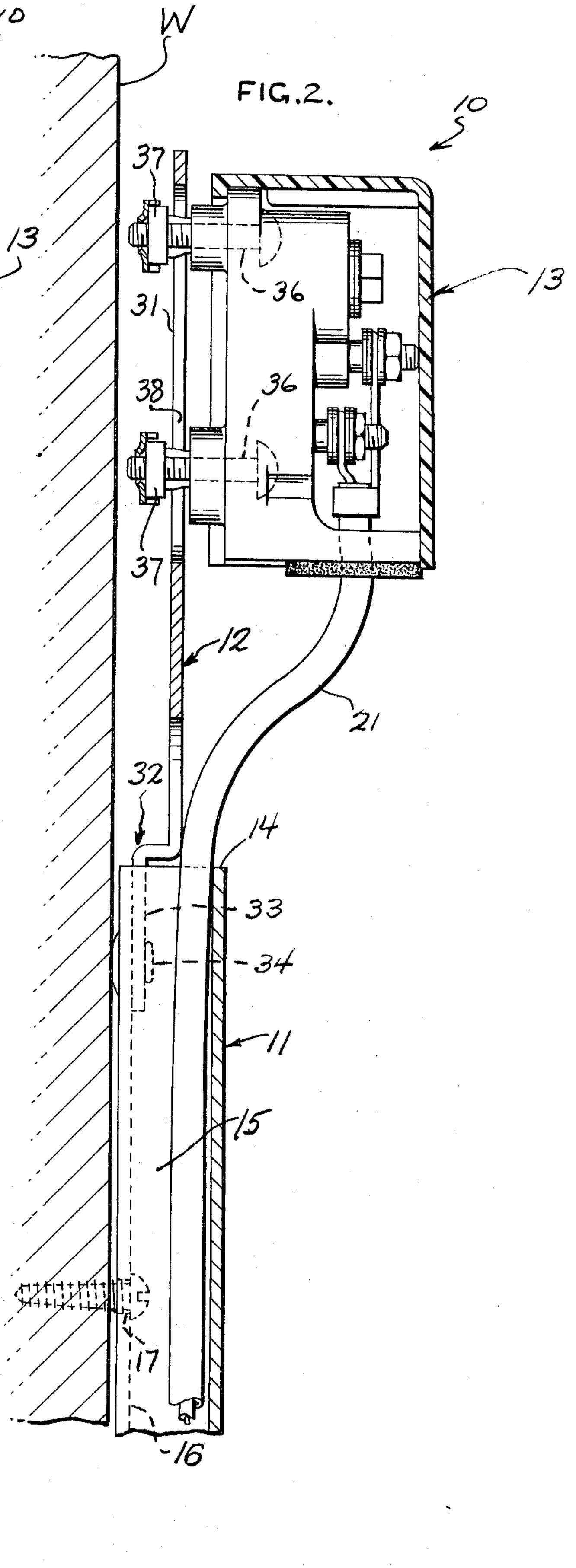
FIG. 2 is a vertical sectional view through the device of FIG. 1.
Figures 3, 4:
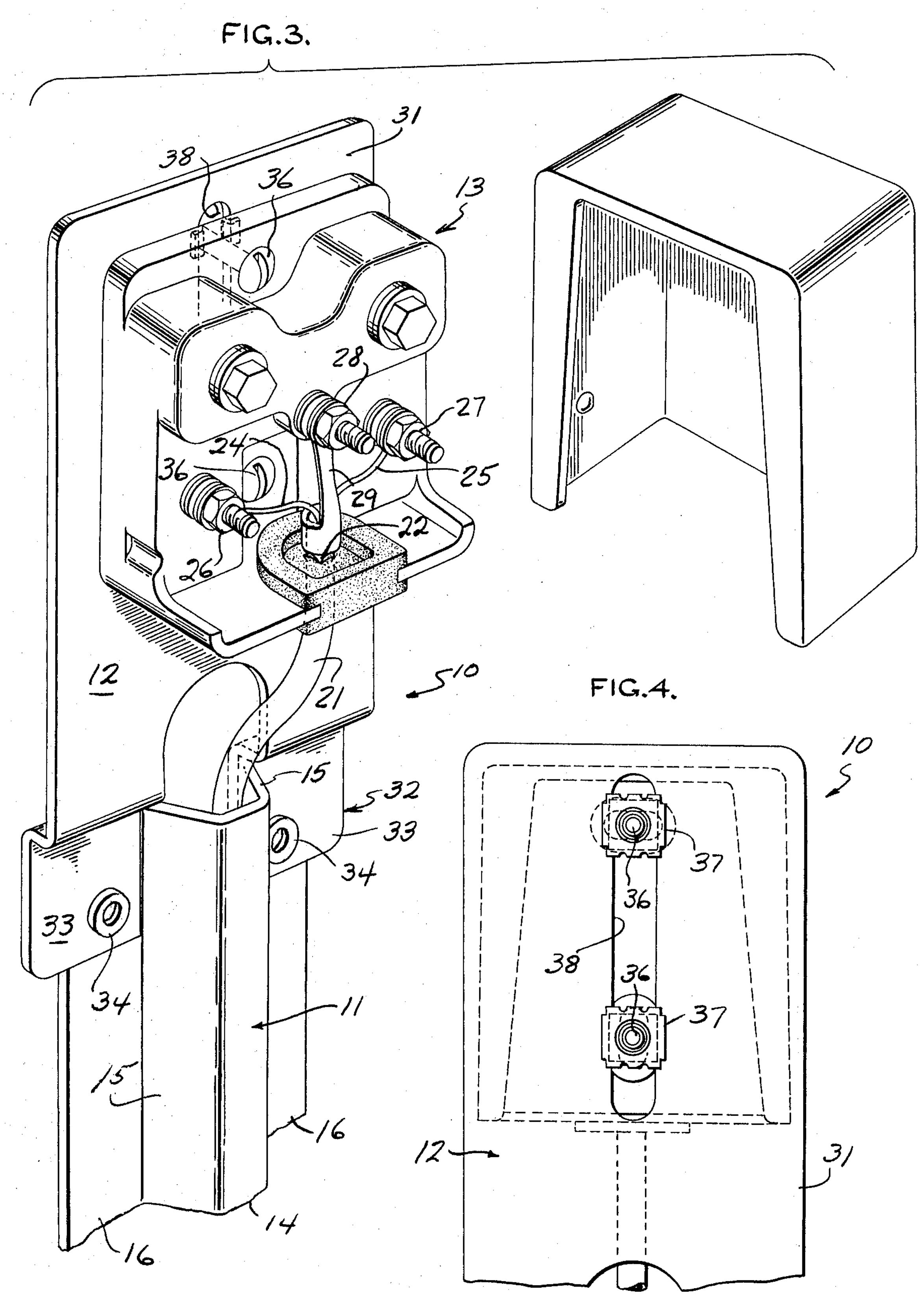
FIG. 3 is an enlarged fragmentary perspective of the upper portion of the device, showing the cover removed from the overvoltage protector.
FIG. 4 is a rear view of the mounting plate at the top of the device.
Figures 5, 6:
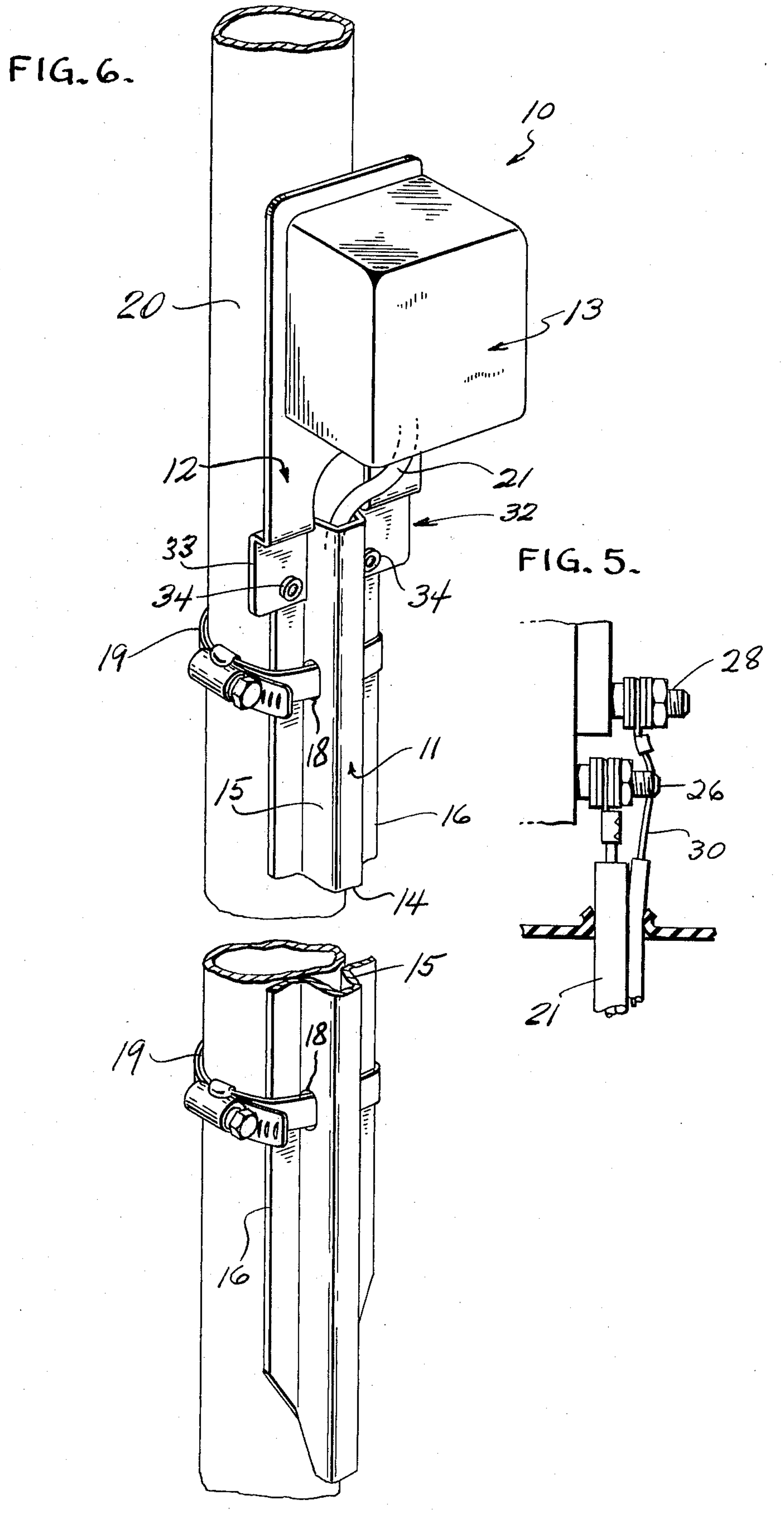
FIg. 5 is a fragmentary view showing a modification of the invention.
FIG. 6 is a perspective illustrating how the device can be secured to an electric meter riser pipe on the exterior of a building.

The ground conductor can comprise a metal sheath surrounding the conductors, as seen in FIGS. 2 and 3; or it can comprise a conductor 30 separate from but alongside the service cable 21 and confined therewith in the interior of the channel shaped stake 11, as seen in FIG. 5.

The mounting plate 12 is also fabricated from sheet metal and comprises a flat upright body 31 and a bifurcated attaching portion 32 which is offset rearwardly out of the plane of the body at the lower portion thereof. The attaching portion is thus characterized by coplanar bifurcations 33 which are parallel to the body portion 31 but are spaced apart laterally a distance to straddle the divergent ends of the flanges 15 on the stake 11. These bifurcations flatwise overlie the front faces of the wings 16 on the stake, and they are secured thereto as by rivets 34.

The circuit protector 13 is secured to the body of the mounting plate directly over the top of the stake by a pair of vertically spaced screws 36. These screws pass through the protector and through apertures in the plate to be threadedly received in special nuts 37 at the rear of the plate. An important feature of the invention resides in the fact that the body 31 of the mounting plate 12 is provided with a vertically elongated aperture 38 through which the screws 36 project, and in which the nuts are slidably but captively retained, to thus facilitate attachment to the mounting plate of the circuit protector 13 and others with different vertically spaced mounting holes.

Another feature of the invention resides in providing the mounting plate with bifurcations 33 that are offset rearwardly sufficiently far as to enable the nuts 37 at the rear of the plate to clear the outer surface of a wall W or an electric meter riser pipe to which the stake is secured. alternatively, this same objective can be achieved with bifurcations which are coplanar with the body portion of the mounting plate, in which case portions of the wings 16 underlying the bifurcations would be offset forwardly the distance required to provide the clearance necessary for the nuts 37.

From the foregoing description, together with the accompanying drawings, it will be readily apparent to those skilled in the art that this invention provides a most convenient mounting structure for the circuit protectors used in the telephone service installations; and that it also conceals and affords excellent protection to that end portion of a buried telephone service cable which is led up out of the ground for connection to the service protector.

Those skilled in the art will appreciate that the invention can be embodied in forms other than as herein disclosed for purposes of illustration.

The invention is defined by the following claims:

1. A mounting device for mounting a telephone circuit protector at an exterior wall of a building to which telephone service is to be supplied via a buried cable, characterized by:

A. an upright plate member having flat front and rear surfaces, and having a vertically elongated slot;

B. captive nuts slidably secured in said slot and providing for the reception of screws for mounting the circuit protector on the front surface of the plate member;

C. an elongated upright stake member having front and rear surfaces and a rearwardly opening groove therein which extends along the entire length of the stake member to receive that end portion of a service cable which is brought up out of the ground for connection to a circuit protector on the plate member, said stake member having a lower end portion which is adapted to be driven into the ground closely adjacent to an exterior wall of a building with its groove facing the same, whereby the stake member can cooperate with said wall in protectively enclosing that portion of a service cable extending from the ground to the circuit breaker; and D. means rigidly securing said plate and stake members together comprising an offset attaching portion on one of said members engaging the other thereof to locate the plate member in a plane forwardly of the rear surface of the stake member a distance such that said nuts will not interfere with positioning of the stake member closely adjacent to the exterior of a building wall in front of which the mounting device is to be located.

2. The mounting device of claim 1, further characterized by:

said groove in the stake member being defined by rearwardly extending opposite marginal flange means on the stake member, having coplanar oppositely directed wings which form the rearmost portions of the stake member to substantially flatwise overlie the exterior of a building wall in front of which the mounting device is to be located, said wings having apertures therein for the reception of securement means by which the mounting device can be held in place on the exterior of a building wall.

* * * * *